E. HÜTTMANN.
KNIFE FOR SURGICAL PURPOSES.
APPLICATION FILED AUG. 18, 1908.

931,612.  Patented Aug. 17, 1909.

UNITED STATES PATENT OFFICE.

ERNST HÜTTMANN, OF HAMBURG, GERMANY.

KNIFE FOR SURGICAL PURPOSES.

No. 931,612.　　　Specification of Letters Patent.　　Patented Aug. 17, 1909.

Application filed August 18, 1908. Serial No. 449,115.

*To all whom it may concern:*

Be it known that I, ERNST HÜTTMANN, a subject of the Emperor of Germany, residing in Hamburg, Germany, Lübeckerstrasse 1, have invented new and useful Improvements in Knives for Surgical Purposes, of which the following is a specification.

This invention relates to a knife for surgical purposes which is especially used for cutting corns.

The object of the new knife is to facilitate the removal or cutting out of portions of hardened skin and the like, the base or bottom portion of which has a round or conical shape. This object is achieved by making the knife in the form of a graver or digger, that is the knife is provided in front at the end with the cutting edge and this edge is arc-shaped. This regular arc-shape is produced by special grinding of the end of knife or cutting steel.

According to the simplest form of carrying out the invention, the knife is ground in such a manner that one end surface of the blade is ground hollow in the transverse direction and the opposite end surface is ground convex, the sharpening of the front edge taking place from the convex-ground surface.

A special form of construction of the new knife consists in this that one end surface is ground hollow in the transverse direction and in the longitudinal direction while the opposite end surface is ground convex and the lateral edges of the hollow ground end of the steel are run to a point like an arc, the point being rounded. Thus a spoon-shape is obtained the front point of which is sharpened. By means of this knife which cuts like a graver or digger, pointed conical incisions or cuts may be made, such as are necessary for instance, for removing the central portion of a corn or the corn proper.

A modification of these two forms of construction consists in this that the end surface is not ground hollow horizontally in the transverse direction, but that a recessed or hollow grinding takes place toward the bottom or base of the knife. The hollow grinding is therefore not horizontal but is slightly beveled or slanted in the downward direction toward the base or bottom of the knife.

The first two forms of construction of the knife according to the present invention are illustrated in the accompanying drawings.

Figure 1:
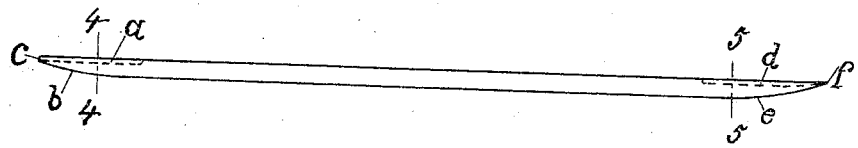
Figure 2:
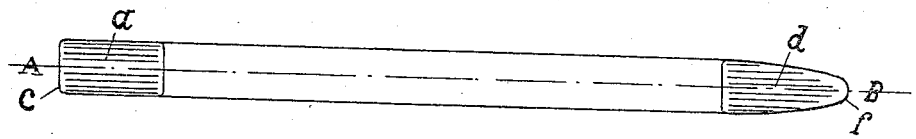
Figure 3:
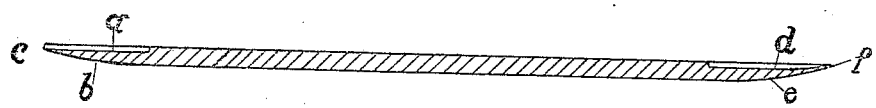
Figure 4:
Figure 5:

Figure 1 is a side view of a knife which is provided at both ends with a cutting edge. Fig. 2 is a plan view thereto, and Fig. 3 is a longitudinal section on the line A—B of Fig. 2, while Fig. 4 is a cross section on the line C—D, Fig. 1, and Fig. 5 is a cross section on the line E—F, Fig. 1.

In the drawings, $a$, indicates the surface of the knife which has been recessed or hollowed out by the hollow grinding in the transverse direction; $b$, indicates the convex ground side of the knife, while $c$, indicates the cutting edge which is somewhat bent or curved; $d$, is the surface of the spoon-shaped knife recessed or hollowed out by the grinding in the transverse and longitudinal directions; $e$, indicates the convex ground surface of the knife, and $f$, the rounded point of the same.

When using the knife for cutting corns the blade or cutting edge, $c$, is used in the first place, the surface, $b$, being directed downward when using the knife. The particular kind of grinding of the edge, $c$, from the surface, $b$, necessitates that the handle must be held somewhat in the upward direction, at the same time however, the advantage is gained that when the knife slides no wounds are caused. The upwardly bent ends of the cutting edge prevent an injury being done to the adjacent skin and flesh portions, such injuries being very frequent when flat knifes are used. Especially when making deep cuts the knife rests most securely on the support or resting surface, so that the same may be handled with the greatest safety after a little practice, and thickened skin may be completely removed. The cutting edge, $f$, serves for removing the corn proper, the manipulation being exactly the same and the same advantages are obtained, namely safe handling, impossibility of doing injury to the flesh and complete removal of portions of hardened skin.

What I claim as new, and desire to secure by Letters Patent, is—

1. A cutting tool made of a steel bar presenting a plane surface on one side and being rounded on the other side, having one end square and the other end pointed, having the rounded side of the tool slightly convexed toward the pointed end, and toward the square end, so as to present the cutting edges in the plane surface of the tool and having at the ends concave depressions in the plane surface to sharpen the angle of the cutting edges.

2. A cutting tool made of a steel bar presenting a plane surface on one side and being rounded on the other side, having one end square and the other end pointed, having the rounded side of the tool slightly convexed toward the pointed end, and toward the square end, so as to present the cutting edges in the plane surface of the tool, and having at the pointed end a concave depression extending from the sharp edges in deepening toward the middle of the tool, and having at the square end a concavity forming part of a surface of a cylinder with its axis parallel to the length of the tool and extending from one lateral cutting edge to the other, substantially as described.

In testimony whereof I affix my signature.

Dated this 23rd, day of July, 1908.

ERNST HÜTTMANN.

In the presence of—
ERNEST H. L. MUMMENHOFF,
OTTO W. HELLMRICH,